US011996640B2

(12) United States Patent
Eminowicz

(10) Patent No.: US 11,996,640 B2
(45) Date of Patent: May 28, 2024

(54) BATTERY TERMINAL CONNECTOR

(71) Applicant: Custom Battery Cables, LLC, Mesa, AZ (US)

(72) Inventor: Vincent William Eminowicz, Apache Junction, AZ (US)

(73) Assignee: Custom Battery Cables, LLC, Mesa, AZ (US)

( * ) Notice: Subject to any disclaimer, the term of this patent is extended or adjusted under 35 U.S.C. 154(b) by 0 days.

(21) Appl. No.: 17/873,366

(22) Filed: Jul. 26, 2022

(65) Prior Publication Data

US 2023/0127680 A1 Apr. 27, 2023

Related U.S. Application Data

(60) Provisional application No. 63/271,643, filed on Oct. 25, 2021.

(51) Int. Cl.
*H01R 11/28* (2006.01)
*H01R 11/12* (2006.01)

(52) U.S. Cl.
CPC ........... *H01R 11/283* (2013.01); *H01R 11/12* (2013.01); *H01R 11/289* (2013.01)

(58) Field of Classification Search
CPC ...... H01R 4/30; H01R 11/287; H01R 11/283; H01R 11/12; H01R 11/289
See application file for complete search history.

(56) References Cited

U.S. PATENT DOCUMENTS 4,064,328 A * 12/1977 Allen .................. H01M 50/553 429/178
6,629,863 B2 * 10/2003 Kieninger ............ H01R 11/282 439/764

FOREIGN PATENT DOCUMENTS

JP H0427565 U * 3/1992

* cited by examiner

*Primary Examiner* — Jean F Duverne
(74) *Attorney, Agent, or Firm* — Inspired Idea Solutions, LLC; Wayne Carroll

(57) ABSTRACT

A battery terminal connector includes a body portion with a first yoke and a second yoke extending forwardly of the body portion to form a terminal receiver hole. A power fastener extends from a rearward end of the body portion to receive one or more of an adapter, a primary cable adapter, and/or an auxiliary cable adapter. Each of the adapter, the primary cable adapter, and/or the auxiliary cable adapter extends rearwardly of the body portion. The adapter has at least a first aperture configured to be coupled to the power fastener and a second aperture configured to be coupled to the auxiliary cable adapter. The auxiliary cable adapter may be coupled to the second aperture with an auxiliary fastener. A cover is coupled over the battery terminal connector.

20 Claims, 7 Drawing Sheets

BATTERY TERMINAL CONNECTOR

FIELD

The present disclosure generally relates to battery terminal connectors, and more particularly to a low-profile battery terminal connectors.

BACKGROUND

Batteries of the type used in automobiles generally have terminal posts extending vertically with a cylindrical, conical, or frusta-conical shape. A conventional connector, used with such battery posts is a generally "U" shaped device with a bolt passing through the outwardly projecting yoke-like arms for securely clamping the connector to the battery post. Other types of connectors have also been created.

Within the yoked connector classification, many variations have been created, each having a different mechanism for attachment to the vehicle's main power cable, or to an auxiliary power cable. These variations may include, but are not limited to: Lucas type, Leyland type, Telco type, European car type, solderless type, Toyota type, military ordinance type, universal type, marine type, forging universal type, Ford cargo type, crimping type, Maruti big type, Dustan plate type, and so forth.

In general, the known variations within the yoked connector classification are configured for attachment to the primary power cable of the vehicle, but lack suitable configurations for attachment of one or more auxiliary power cables. Where configurations for auxiliary power cables are provided, those configurations are awkward, clunky, difficult to work with, and/or resemble an afterthought in the design of the connector.

Therefore, an improved connector configuration for attachment of one or more auxiliary power cables is needed to simplify attachment and installation.

SUMMARY

A battery terminal connector comprising a body portion having a first yoke and a second yoke extending forwardly of the body portion, the first and second yokes forming a terminal receiver hole, a power fastener extending from a rearward end of the body portion, and an adapter coupled to the power fastener, the adapter extending rearwardly from the rearward end of the body portion, the adapter having at least two apertures.

A method of connecting a primary cable and an auxiliary cable to a battery terminal connector, the battery terminal connector having a body portion, a first yoke and a second yoke extending forwardly of the body portion, a power fastener extending from a rearward end of the body portion, the method comprising coupling an adapter to the power fastener so the adapter extends rearwardly from a rearward end of the body portion, the adapter having at least two apertures.

A method of connecting a primary cable and an auxiliary cable to a battery terminal connector, the battery terminal connector having a body portion, a first yoke and a second yoke extending forwardly of the body portion, and a power fastener extending from a rearward end of the body portion, the method comprising coupling an auxiliary cable adapter to the auxiliary cable and coupling the auxiliary cable adapter to the power fastener so the auxiliary cable adapter extends rearwardly from a rearward end of the body portion.

BRIEF DESCRIPTION OF THE DRAWINGS

Various aspects and advantages will become apparent upon review of the following detailed description and upon reference to the drawings in which.

DETAILED DESCRIPTION

The following disclosure includes a battery terminal connector apparatus and method therefore. The apparatus includes an adapter configured to enable attachment of an auxiliary cable on an end (e.g., the rearward end) of the battery terminal connector opposing the outwardly projecting yoke-like arms (e.g., where the yoke-like arms are on the forward end). It is noteworthy that the adapter facilitates attachment of the auxiliary cable ONLY rearward of the battery terminal connector, and not on any other side thereof (e.g., not extending laterally on either side, nor upward above, nor downward below the battery terminal connector).

Furthermore, owing to the simplicity of the design of the adapter, the adapter is simple to manufacture and simple to install. Furthermore, the adapter enables attachment of an auxiliary cable within any generic battery terminal connector cover, such that the battery terminal connector may be protected from moisture and other contaminants during use.

Figure 1:
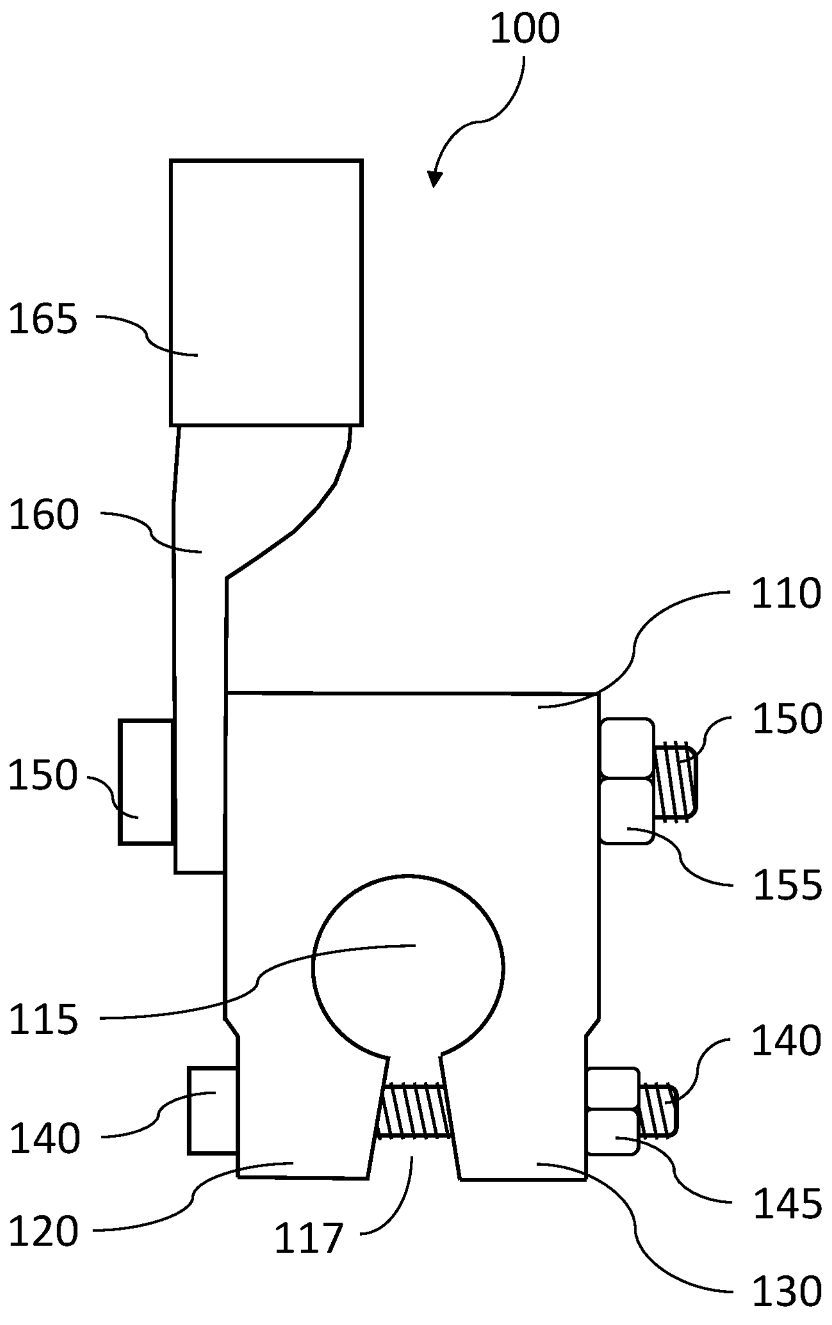
FIG. 1 illustrates a top view of a battery terminal connector.

FIG. 1 illustrates a battery terminal connector 100 having a body portion 110, a first yoke 120, and a second yoke 130. The first and second yokes 120, 130 may be formed integrally with body portion 110. The first and second yokes 120, 130 may extend forwardly of body portion 110. The first and second yokes 120, 130 may collectively form a terminal receiver hole 115. The forward ends of first and second yokes 120, 130 may be disjoined forming a gap 117. Thus, terminal receiver hole 115 may be an imperfect hole, in that terminal receiver hole 115 may not have material entirely around its perimeter.

Generally, it is understood that terminal receiver hole 115 is shaped and designed to approximately mirror the shape and design of a battery terminal (e.g., mirroring the frusta-conical shape. An aperture (not shown) may extend laterally (e.g., from right side to left side) through the forward ends of first and second yokes 120, 130. A post fastener 140 (e.g., a bolt) may be inserted through this aperture so that post fastener 140 extends through first yoke 120, then gap 117, then second yoke 130. Post fastener 140 may extend outward and/or beyond second yoke 130.

A post retainer 145 (e.g., a nut) may be secured to post fastener 140. When a battery terminal is inserted into terminal receiver hole 115, post fastener 140 and/or post retainer 145 may be tightened to secure the battery terminal within terminal receiver hole 115. During tightening, first yoke 120 and second yoke 130 may be pulled toward each other, which may reduce the size of gap 117 and may further reduce the size of terminal receiver hole 115. While a bolt/nut configuration has been shown, a person of ordinary skill in the art will appreciate that any number of known fastening means may be used to secure the battery terminal within terminal receiver hole 115.

An aperture (not shown) may extend laterally (e.g., from right side to left side) through the rearward end of body portion 110. A primary cable adapter 160 may be secured to a primary cable 165 (e.g., by crimping, soldering, or other known method). The primary cable adapter 160 may have an aperture (not shown) extending laterally through a tip thereof. The aperture of the primary cable adapter 160 may be aligned with the aperture of the body portion 110.

A power fastener 150 (e.g., a bolt) may be inserted through these apertures so that power fastener 150 extends through the aperture of the primary cable adapter 160, then through the aperture of the body portion 110. Power fastener 150 may extend outward and/or beyond body portion 110. A power retainer 155 (e.g., a nut) may be secured to power fastener 150. While a bolt/nut configuration has been shown, a person of ordinary skill in the art will appreciate that any number of known fastening means may be used to secure the primary cable adapter 160 to body portion 110 (e.g., to battery terminal connector 100).

In light of the above configurations, it is understood that power derived from a battery may be passed through the battery terminal, through first and second yokes 120, 130, through body portion 110, through primary cable adapter 160, to primary cable 165 (e.g., formed of electrically conductive material). Power may be carried by primary cable 165 to various electrical systems of the vehicle or other device which relies upon the battery as a power source. Incidentally, power may also be passed through post fastener 140, post retainer 145, power fastener 150, and/or power retainer 155 (e.g., formed of electrically conductive material).

Figure 2:
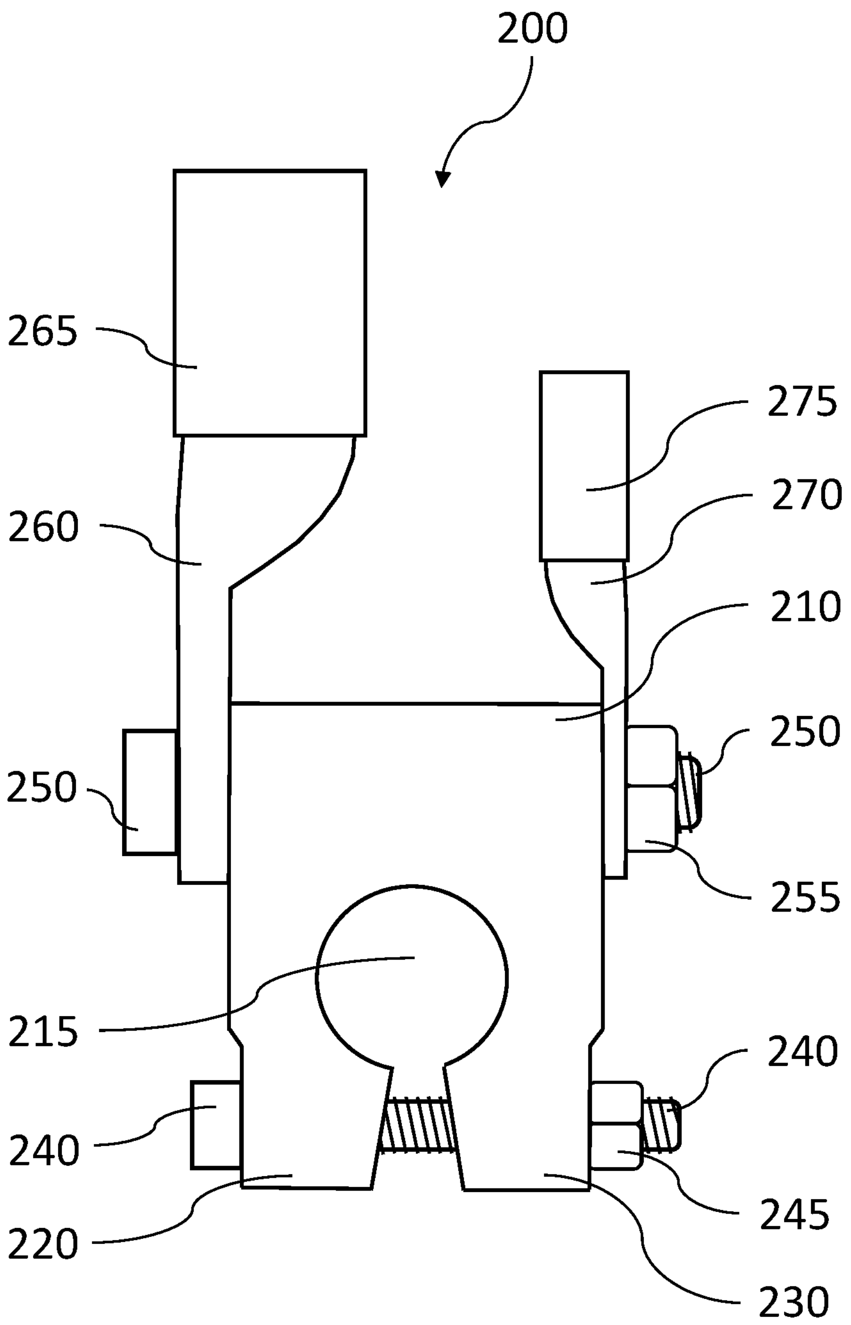
FIG. 2 illustrates a top view of a battery terminal connector.

FIG. 2 illustrates a battery terminal connector 200 having a body portion 210, a first yoke 220, a second yoke 230, a post fastener 240 extending through apertures in the forward ends of the first and second yokes 220, 230, and a post retainer 245 secured to the post fastener 240. The first and second yokes 220, 230 may extend forwardly of the body portion 210 to form a central bore 215 for receiving a battery terminal. Post fastener 240 and post retainer 245 may be loosened and/or tightened to deflect the first and second yokes 220, 230 away and/or toward one another (e.g., to release and/or retain the battery terminal).

An aperture (not shown) may extend laterally (e.g., from right side to left side) through the rearward end of body portion 210. A primary cable adapter 260 may be secured to a primary cable 265. The primary cable adapter 260 may have an aperture (not shown) extending laterally through a tip thereof. The aperture of the primary cable adapter 260 may be aligned with the aperture of the body portion 210 (e.g., on a left side of battery terminal connector 200). An auxiliary cable adapter 270 may be secured to an auxiliary cable 275. The auxiliary cable adapter 270 may have an aperture (not shown) extending laterally through a tip thereof. The aperture of the auxiliary cable adapter 270 may be aligned with the aperture of the body portion 210 (e.g., on a right side of battery terminal connector 200).

A power fastener 250 (e.g., a bolt) may be inserted through these apertures so that power fastener 250 extends through the aperture of the primary cable adapter 260, then through the aperture of the body portion 210, then through the aperture of the auxiliary cable adapter 270 (e.g., primary and auxiliary cable adapters 260, 270 may be coupled on opposing ends of power fastener 250). Power fastener 250 may extend outward and/or beyond body portion 210. A power retainer 255 (e.g., a nut) may be secured to power fastener 250. While a bolt/nut configuration has been shown, a person of ordinary skill in the art will appreciate that any number of known fastening means may be used to secure the primary and/or auxiliary cable adapters 260, 270 to body portion 210 (e.g., to battery terminal connector 200).

It is noteworthy that the addition of the auxiliary cable adapter 270 (e.g., on the right side of battery terminal connector 200) does not increase the overall dimension of the battery terminal connector 200, since power fastener 250 remains the same length with or without attachment of auxiliary cable adapter 270.

Figure 3:
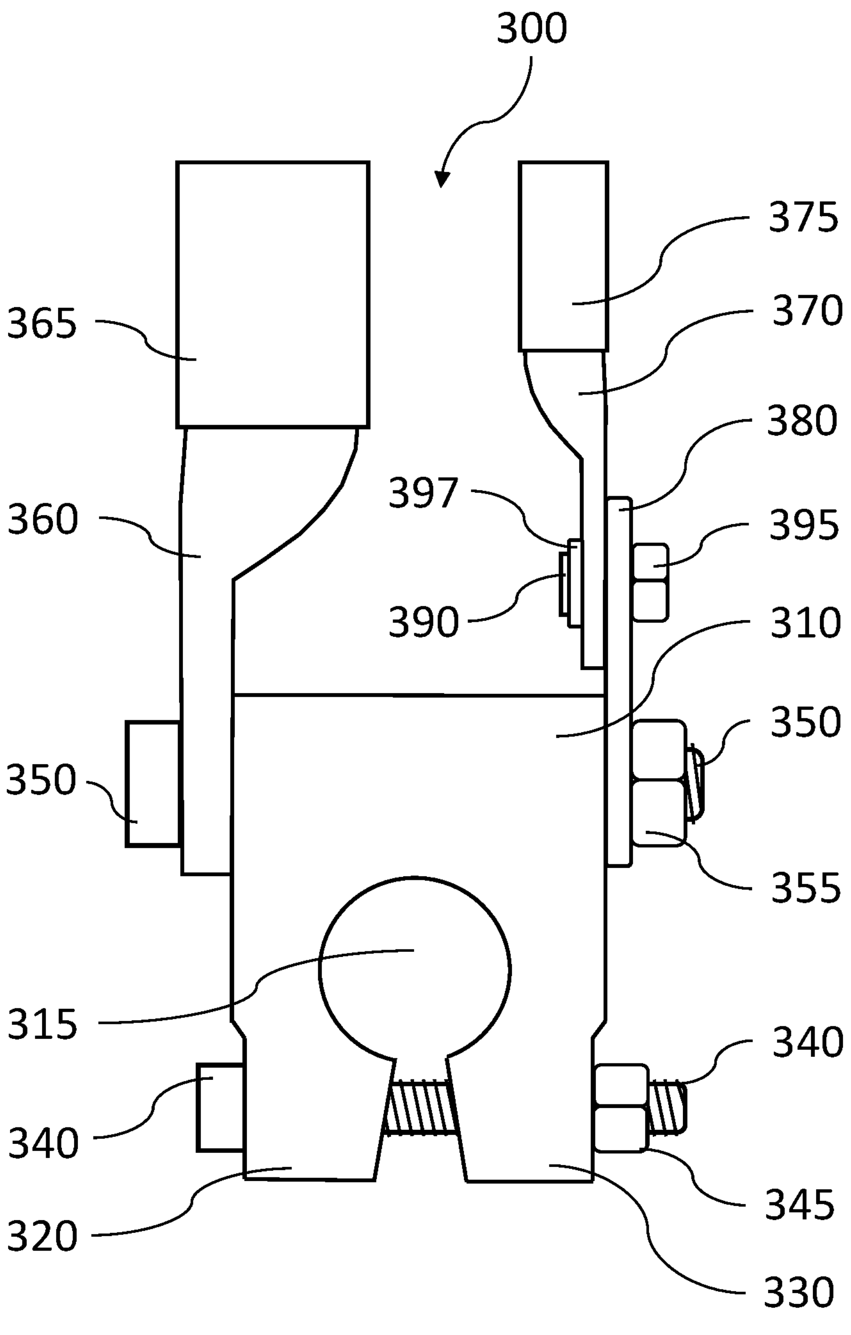
FIG. 3 illustrates a top view of a battery terminal connector.

FIG. 3 illustrates a battery terminal connector 300 having a body portion 310, a first yoke 320, a second yoke 330, a post fastener 340 extending through apertures in the forward ends of the first and second yokes 320, 330, and a post retainer 345 secured to the post fastener 340. The first and second yokes 320, 330 may extend forwardly of the body portion 310 to form a central bore 315 for receiving a battery terminal. Post fastener 340 and post retainer 345 may be loosened and/or tightened to deflect the first and second yokes 320, 330 away and/or toward one another (e.g., to release and/or retain the battery terminal).

An aperture (not shown) may extend laterally through the rearward end of body portion 310. A primary cable adapter 360 may be secured to a primary cable 365. The primary cable adapter 360 may have an aperture (not shown) extending laterally through a tip thereof. The aperture of the primary cable adapter 360 may be aligned with the aperture of the body portion 310 (e.g., on a left side of battery terminal connector 300). An adapter 380 may be secured to body portion 310. The adapter 380 may have one or more apertures (e.g., apertures 483, 485 of FIG. 4). The one or more apertures may include a first aperture extending laterally through a forward end of adapter 380. The first aperture of adapter 380 may be aligned with the aperture of the body portion 310 (e.g., on a right side of battery terminal connector 300).

A power fastener 350 (e.g., a bolt) may be inserted through these apertures so that power fastener 350 extends through the aperture of the primary cable adapter 360, then through the aperture of the body portion 310, then through the first aperture of the adapter 380. Power fastener 350 may extend outward and/or beyond body portion 310 and further may extend outward and/or beyond adapter 380. A power retainer 355 (e.g., a nut) may be secured to power fastener 350. While a bolt/nut configuration has been shown, a person of ordinary skill in the art will appreciate that any number of known fastening means may be used to secure the primary cable adapters 360 and/or adapter 380 to body portion 310 (e.g., to battery terminal connector 300).

An auxiliary cable adapter 370 may be secured to an auxiliary cable 375. The auxiliary cable adapter 370 may have an aperture (not shown) extending laterally through a tip thereof (e.g., from a right side to a left side). The aperture of the auxiliary cable adapter 370 may be aligned with a second aperture extending laterally through a rearward end of adapter 380 (e.g., along an axis approximately parallel to an axis of the aperture of body portion 110). An auxiliary fastener 390 (e.g., a bolt) may be inserted through these apertures so that auxiliary fastener 390 extends through the aperture of the auxiliary cable adapter 370, then through the second aperture of adapter 380. Auxiliary fastener 390 may extend outward and/or beyond adapter 380. An auxiliary retainer 395 (e.g., a nut) may be secured to auxiliary fastener 390. A locking device 397 (e.g., a lock-washer) may be configured either between a head of auxiliary fastener 390 and auxiliary cable adapter 370, between auxiliary cable adapter 370 and adapter 380, or between adapter 380 and auxiliary retainer 395. A person of ordinary skill in the art will appreciate that as an alternative to a locking device 397, any one or more of the retainers discussed in this disclosure may incorporate locking features (e.g., such as a lock-nut).

It is noteworthy that the addition of the adapter 380 (e.g., on the right side of battery terminal connector 300) may not increase the overall dimension of the battery terminal connector 300, since power fastener 350 remains the same length with or without attachment of adapter 380. Further, the attachment of auxiliary cable adapter 370 to adapter 380, including the selection and/or placement of auxiliary fastener 390, auxiliary retainer 395, and/or locking device 397 likewise may not increase the overall transverse width dimension (e.g., as measures from the furthest rightward point to the furthest leftward point) of the battery terminal connector 300.

While adapter 380 is represented as extending substantially linearly from its forward end to its rearward end, this need not be the case. Adapter 380 may extend linearly or having a curvature (e.g., having a uniform curvature). Adapter 380 may extend linearly and having a curvature (e.g., regions of both along its length). Adapter 380 may have one or more bends (e.g., extending linearly to a bend, then linearly), such that adapter 380 may be bent inwardly or outwardly to facilitate attachment. It may be desirable to shape adapter 380 in such a way as to minimize the transverse width dimension between primary cable adapter 360 and auxiliary cable adapter 370.

Figure 4:
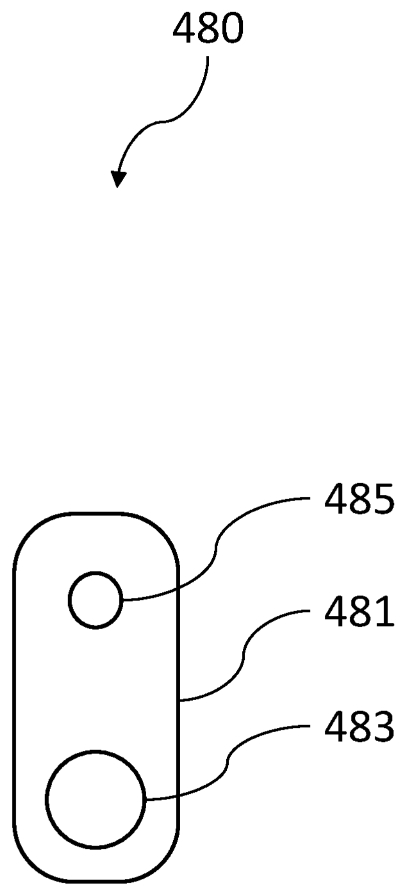
FIG. 4 illustrates a side view of an adapter.

FIG. 4 illustrates an adapter 480 having a body portion 481, a first aperture 483, and a second aperture 485. First aperture 483 may have a first diameter and/or a first circumference. Second aperture 485 may have a second diameter and/or a second circumference. The first diameter may be greater than the second diameter. The first circumference may be greater than the second circumference. First aperture 483 may be sized to enable passage of a power fastener therethrough (e.g., power fastener 350 of FIG. 3). Second aperture 485 may be sized to enable passage of an auxiliary fastener therethrough (e.g., auxiliary fastener 390 of FIG. 3).

In general, the primary cable (e.g., primary cable 365) may be larger and/or may have a greater diameter than any auxiliary cable (e.g., auxiliary cable 375), such that the aperture of a corresponding primary cable adapter may be larger and/or may have a greater diameter than any aperture of a corresponding auxiliary cable adapter. Therefore, the power fastener used to retain the primary cable adapter to a body portion of a battery terminal connector may have a diameter sized and/or dimensioned to fit the primary cable adapter and/or the body portion.

As the auxiliary cable adapter may be smaller, the corresponding aperture of the auxiliary cable adapter may be too small to allow the power fastener to extend therethrough (e.g., negating any possibility of the use of the configuration described with respect to FIG. 2). Thus, adapter 480 may be configured to interact with and/or be secured by the power fastener (e.g., at first aperture 483), and may extend rearwardly from the battery terminal connector to a distance great enough that the auxiliary cable adapter may be secured to adapter 480 rearwardly of the battery terminal connector (e.g., at second aperture 485).

The precise length of adapter 480 and/or the distance between first aperture 483 and second aperture 485 may be dimensioned so that when first aperture 483 is aligned with an aperture of the body portion of the battery terminal connector, the rearmost point of the body portion extends to about half the distance between first aperture 483 and second aperture 485 (e.g., between about 30% and about 70% of the distance between first aperture 483 and second aperture 485). Adapter 480 may have a substantially rectangular shape with rounded and/or beveled corners, though this need not be the case (e.g., having a circular, triangular, oval, polygonal, or other shape, e.g., such as to facilitate attachment of two or more auxiliary cable adapters). Nevertheless, it may be desirable to shape adapter 380 in such a way as to minimize its dimensions to facilitate attachment of a cover over the corresponding battery terminal connector.

Figure 5:
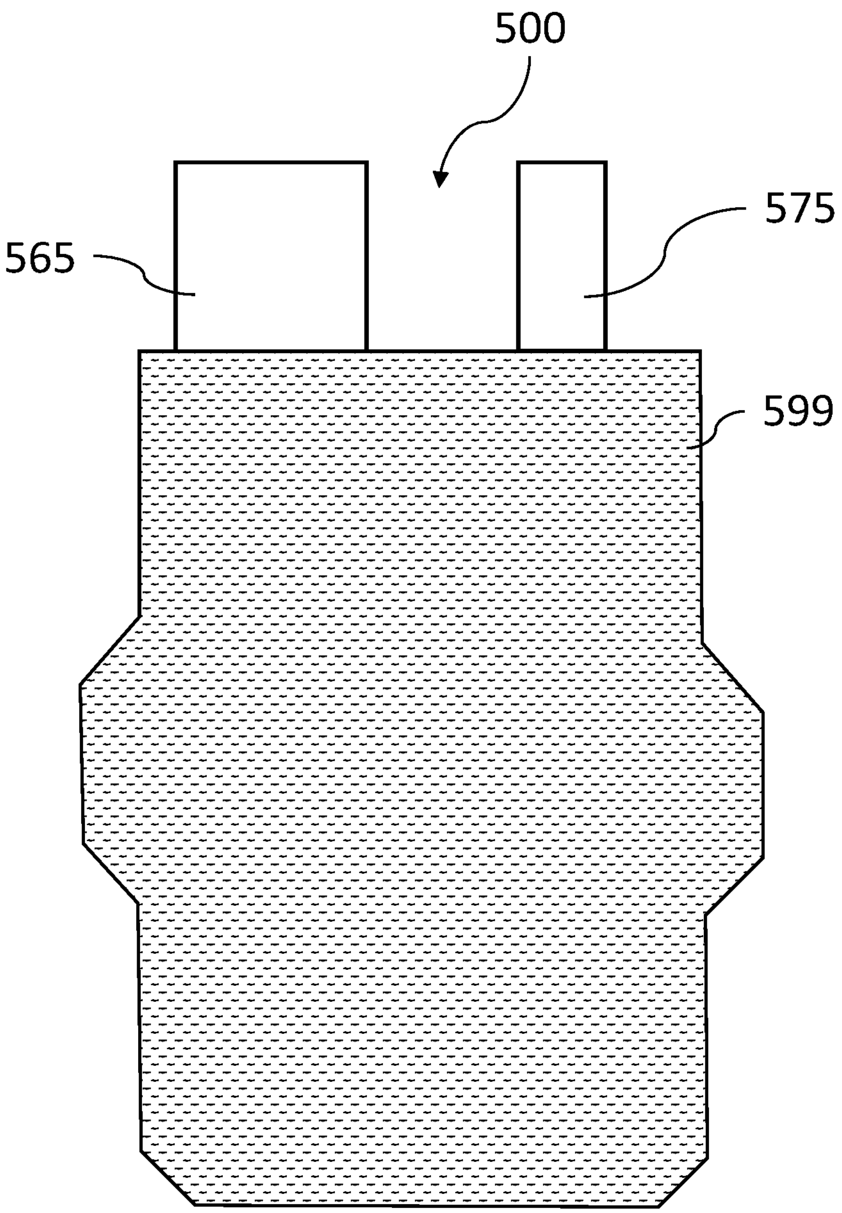
FIG. 5 illustrates a top view of a battery terminal connector and cover.

FIG. 5 illustrates a battery terminal connector 500 enclosed within a cover 599 (e.g., the cover 599 coupled in a covering relationship over the battery terminal connector 500). The various components of the battery terminal connector 500 may be formed of an electrically conductive material, such that it may be desirable to encase and/or enclose the metallic components to prevent power from accidentally being grounded to an unintended or accidental ground (e.g., a human, equipment, or other electrically conducting object).

The cover 599 may completely cover the electrically conductive material. Cover 599 may be formed of electrically non-conductive material. Cover 599 may be formed and/or shaped such that only encapsulated cable extends outward beyond cover 599. Thus, where a primary cable 565 is coupled to battery terminal connector 500 as heretofore described, only primary cable 565 may extend outward beyond cover 599. Further, where an auxiliary cable 575 is coupled to battery terminal connector 500 as heretofore described, only primary cable 565 and auxiliary cable 575 may extend outward beyond cover 599. In the above examples, it is understood that cables 565, 575 represent an electrically conductive material encapsulated in an electrically non-conductive material, such that the electrically conductive material is coupled to corresponding cable adapters as heretofore described.

Figure 6:
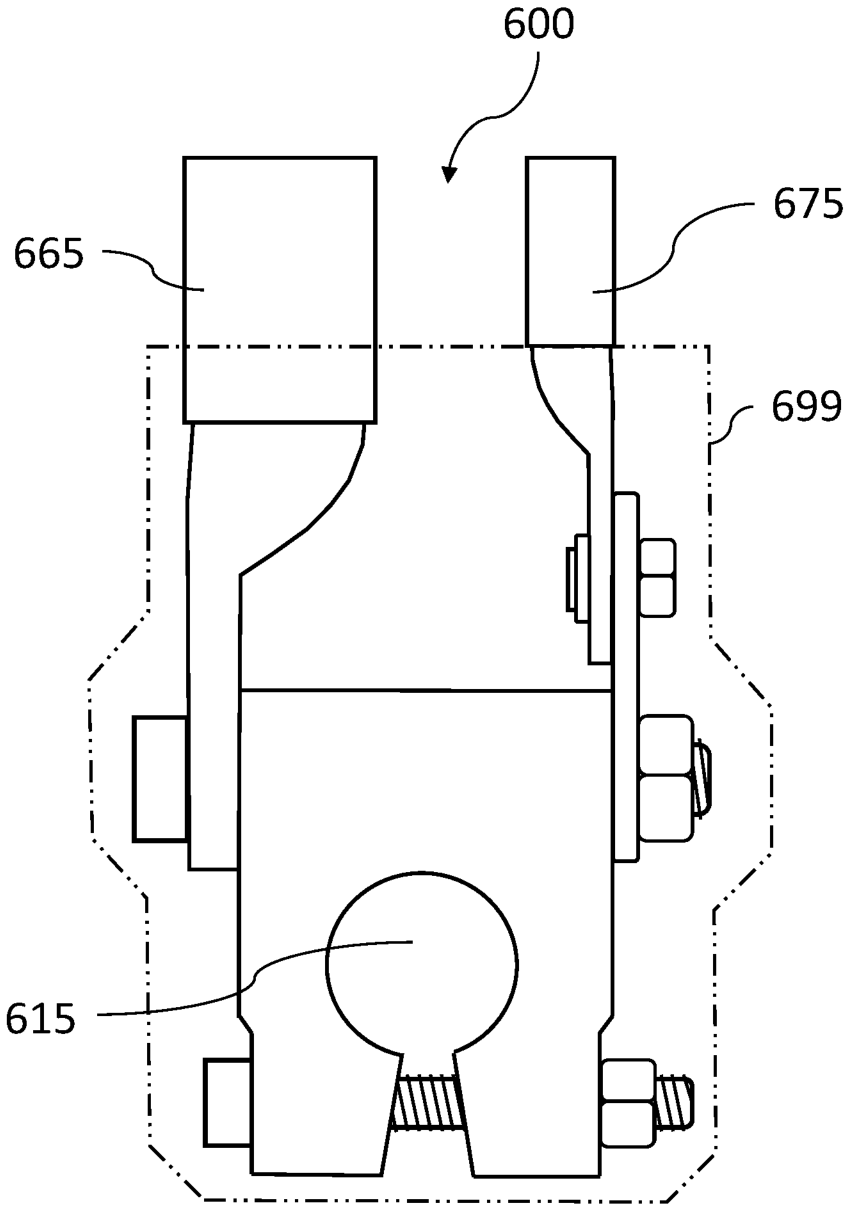
FIG. 6 illustrates a top view of a battery terminal connector and cover.

FIG. 6 illustrates a battery terminal connector 600 enclosed within a cover 699 (e.g., represented in stippled lines to enable view of the various components of battery terminal connector 600). Cover 699 may be formed of an electrically non-conductive material, and may be sized and dimensioned to encase and/or enclose the metallic components to prevent power from accidentally being grounded to an unintended or accidental ground (e.g., except for sheathed portions of primary cable 665 and/or auxiliary cable 675). Further, battery terminal connector 600 may be configured with a terminal receiver hole 615, which may receive a terminal protruding from a battery or other power source. Cover 699 may be sized and dimensioned to encase and/or enclose the terminal.

Cover 699 may be substantially rectangularly shaped, though this need not be the case. Cover 699 may be narrower or wider at different positions along its length to accommodate the dimensions of battery terminal connector 600. Cover 699 may be wider at a position corresponding to a power fastener of battery terminal connector 600. Cover 699 may be narrower at a position corresponding to a post fastener of battery terminal connector 600 and/or corresponding to a position of the primary and auxiliary cable adapters.

Figures 7A, 7B:
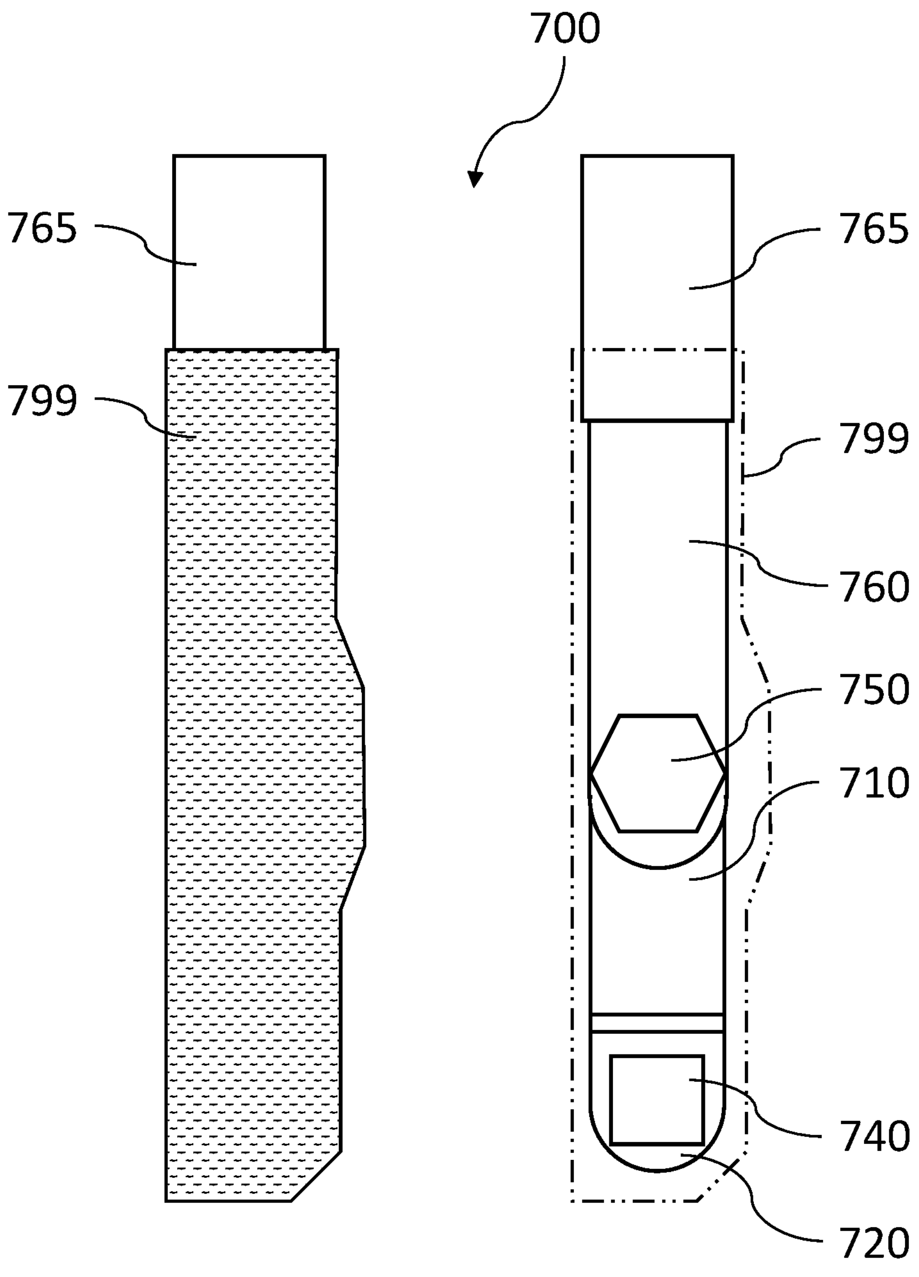
FIG. 7A illustrates a side view of a battery terminal connector and cover.
FIG. 7B illustrates a side view of a battery terminal connector and cover.

FIGS. 7A and 7B illustrate a battery terminal connector 700 enclosed within a cover 799. FIG. 7A illustrates the cover 799 enclosing and/or encapsulating battery terminal connector 700. FIG. 7B illustrates the cover 799 in stippled lines to enable view of the various components of battery terminal connector 700.

It is noteworthy that as viewed from the side (e.g., the left side), a primary cable 765 coupled to a primary cable adapter 760 is viewable, with primary cable adapter 760 coupled rearwardly of body portion 710 by power fastener 750. A post fastener 740 is also viewable at a forward end of a first yoke 720 extending forwardly of body portion 710. The corresponding adapter (e.g., adapter 380), an auxiliary cable adapter, and auxiliary cable are not viewable from this viewpoint because they are dimensioned to be equal or smaller than the other components of the apparatus. In the event that the adapter, auxiliary cable adapter, and/or auxiliary cable were greater is size and/or dimension, they would likely obstruct cover 799 and may prevent cover 799 from being secured over battery terminal connector 700.

Other aspects will be apparent to those skilled in the art from consideration of the specification and practice disclosed herein. It is intended, therefore, that the specification and illustrated embodiments be considered as examples only.

What is claimed is:

1. A battery terminal connector, comprising:

a body portion having a first yoke and a second yoke extending forwardly of the body portion, the first and second yokes forming a terminal receiver hole;

a power fastener extending through a rearward end of the body portion, the power fastener coupling a primary cable adapter to the rearward end of the body portion; and an adapter having a first end and a second end, the power fastener coupling the adapter to the rearward end of the body portion at a first end of the adapter, the adapter extending rearwardly from the rearward end of the body portion, the adapter coupled to an auxiliary cable adapter at a second end of the adapter.

2. The battery terminal connector of claim 1, further including a post fastener extending between forward ends of the first and second yokes.

3. The battery terminal connector of claim 1, wherein the power fastener extends through a first aperture in the first end of the adapter.

4. The battery terminal connector of claim 1, further including a primary cable extending rearwardly from the primary cable adapter.

5. The battery terminal connector of claim 1, further including an auxiliary cable extending rearwardly from the auxiliary cable adapter, the auxiliary cable adapter coupled to the adapter at a second aperture in the second end of the adapter.

6. The battery terminal connector of claim 5, further including a primary cable extending rearwardly from the primary cable adapter.

7. The battery terminal connector of claim 6, wherein the primary cable adapter and the auxiliary cable adapter are coupled on opposing ends of the power fastener.

8. The battery terminal connector of claim 6, wherein the primary cable adapter and the auxiliary cable adapter are coupled on opposing sides of the body portion.

9. The battery terminal connector of claim 6, further including a cover coupled in a covering relationship over the body portion, the first and second yokes, the power fastener, the adapter, the primary cable adapter, and the auxiliary cable adapter.

10. A method of connecting a primary cable adapter and an auxiliary cable adapter to a battery terminal connector, the battery terminal connector having a body portion, a first yoke and a second yoke extending forwardly of the body portion, a power fastener extending through a rearward end of the body portion, the method comprising:

coupling the primary cable adapter to the power fastener so the primary cable adapter extends rearwardly from a rearward end of the body portion;

coupling an adapter at a first end to the power fastener so the adapter extends rearwardly from a rearward end of the body portion; and coupling the auxiliary cable adapter to the adapter at a second end, so the primary cable adapter extends rearwardly from a rearward end of the body portion.

11. The method of claim 10, further including:

coupling a post fastener to forward ends of the first and second yokes.

12. The method of claim 10, wherein the power fastener extends through a first aperture in the first end of the adapter.

13. The method of claim 10, further including:

coupling the primary cable adapter to a primary cable; and coupling the auxiliary cable adapter to an auxiliary cable.

14. The method of claim 10, further including:

coupling the primary cable adapter to the power fastener by passing the power fastener through an aperture in the primary cable adapter; and coupling the adapter to the power fastener by passing the power fastener through a first aperture in the first end of the adapter; and coupling the auxiliary cable adapter to the adapter at a second aperture in the second end of the adapter.

15. The method of claim 14, further including:

coupling the primary cable adapter to a primary cable; and coupling the auxiliary cable adapter to an auxiliary cable.

16. The method of claim 15, wherein the primary cable adapter and the auxiliary cable adapter are coupled on opposing ends of the power fastener.

17. The method of claim 15, wherein the primary cable adapter and the auxiliary cable adapter are coupled on opposing sides of the body portion.

18. A method of connecting a primary cable adapter and an auxiliary cable adapter to a battery terminal connector, the battery terminal connector having a body portion, a first yoke and a second yoke extending forwardly of the body portion, and a power fastener extending through a rearward end of the body portion, the method comprising:

coupling the primary cable adapter to the power fastener so the primary cable adapter extends rearwardly from a rearward end of the body portion; and coupling the auxiliary cable adapter to the power fastener so the auxiliary cable adapter extends rearwardly from a rearward end of the body portion.

19. The method of claim 18, wherein the primary cable adapter and the auxiliary cable adapter are coupled on opposing sides of the body portion.

20. The method of claim 18, wherein the primary cable adapter and the auxiliary cable adapter are coupled on opposing ends of the power fastener.

* * * * *